United States Patent
Fairchild

Patent Number: 5,821,852
Date of Patent: Oct. 13, 1998

[54] TRAILER HITCH ALIGNMENT DEVICE

[76] Inventor: O. Dean Fairchild, P.O. Box 851, Stanfield, Oreg. 97875

[21] Appl. No.: 859,493

[22] Filed: May 20, 1997

[51] Int. Cl.⁶ ................................................. G08B 21/00
[52] U.S. Cl. ........................................... 340/431; 280/477
[58] Field of Search ................................ 340/815.4, 901, 340/431; 280/477

[56] References Cited

U.S. PATENT DOCUMENTS

| | | | |
|---|---|---|---|
| 3,825,921 | 7/1974 | Marus et al. | 340/431 |
| 3,938,122 | 2/1976 | Mangus | 340/275 |
| 4,186,939 | 2/1980 | Woods et al. | 2870/477 |
| 4,187,494 | 2/1980 | Jessee | 340/52 R |
| 4,205,453 | 6/1980 | Steele | 340/431 |
| 4,854,604 | 8/1989 | Stallsworth | 280/477 |
| 4,991,865 | 2/1991 | Francisco | 280/477 |
| 5,035,441 | 7/1991 | Murray | 280/477 |
| 5,085,408 | 2/1992 | Norton et al. | 254/325 |
| 5,108,123 | 4/1992 | Rubenzik | 280/477 |
| 5,180,182 | 1/1993 | Haworth | 280/477 |
| 5,269,554 | 12/1993 | Law et al. | 280/477 |
| 5,513,870 | 5/1996 | Hickman | 280/477 |
| 5,650,764 | 7/1997 | McCullough | 340/431 |

*Primary Examiner*—Jeffery A. Hofsass
*Assistant Examiner*—Toan N. Pham
*Attorney, Agent, or Firm*—Terrance L. Siemens

[57] ABSTRACT

Apparatus for indicating axial alignment or deviation from alignment, and proximity between a tow vehicle and a trailer towards which the tow vehicle must be maneuvered. The apparatus comprises a storage reel mounted on the tow vehicle for storing and paying out a cord, a pulley having a magnet for mounting the pulley temporarily on the trailer hitch, and a take up reel mounted on the tow vehicle for applying tension to the cord. As the tow vehicle is maneuvered, changes in relative position between tow vehicle and trailer cause the cord to change length and angular orientation relative to the tow vehicle. These changes are sensed as one or both of the storage reel and take up reel rotate responsive to cord changes. A plurality of switches make or break contact to a matrix of indicating lamps located in the cabin of the tow vehicle, the indicating lamps indicating position of the tow vehicle relative to the trailer. The reels are permanently or temporarily mounted on the tow vehicle. The pulley has a magnet for temporary, readily removable attachment to the trailer hitch.

1 Claim, 5 Drawing Sheets

TRAILER HITCH ALIGNMENT DEVICE

BACKGROUND OF THE INVENTION

1. Field of the Invention

The present invention relates to apparatus for aligning a tow vehicle bearing a trailer hitch ball to a trailer bearing a hitch socket. More particularly, the invention provides indicating lamps for indicating relative locations of the ball and socket, switches for illuminating selected lamps, and a probe for activating appropriate switches. The probe comprises a cord paid out from a storage reel mounted on the tow vehicle, extending to and encircling a pulley adhered to the trailer hitch, and extending to a take up reel disposed upon the tow vehicle. The switches respond to length of cord paid out and to angle existing between the tow vehicle and the socket of the trailer.

2. Description of the Prior Art

Moving a tow vehicle towards a trailer to be towed and aligning a towing ball disposed upon the tow vehicle and a tow hitch disposed upon the trailer is a notoriously difficult undertaking. Because no direct line of sight exists between the operator of the tow vehicle and the ball and hitch, the operator must estimate relative locations of the socket of the hitch and the ball with which the socket must be vertically aligned. Even if the operator periodically leaves the cabin of the tow vehicle to observe directly critical proximity and alignment of the tow vehicle and trailer, estimating appropriate steering corrections and distances remains extremely difficult.

The prior art has suggested many approaches to solving this problem. U.S. Pat. No. 3,825,921, issued to Louis J. Marus et al. on Jul. 23, 1974, describes an induction based sensor which controls a dial display located proximate the operator of the tow vehicle. By contrast with the device of Marus et al., the present invention makes physical connection to the trailer, and bases input signals on displacement of a probe physically connected to the trailer. The output of the present invention is a matrix of indicating lights rather than a dial indicator. The matrix of indicating lights indicate not only discrepancy in axial alignment of the two vehicles, as performed by Marus et al., but also indicates relative proximity, which information Marus et al. fails to report. Marus et al. requires careful and secure mounting of one of an induction coil and an emitter on the trailer. By contrast, the present invention provides convenient yet secure temporary mounting by magnetic attraction.

Apparatus for improving the operator's view of components of the two vehicles as they approach one another is shown in U.S. Pat. Nos. 5,180,182, issued to James R. Haworth on Jan. 19, 1993, and 5,269,554, issued to Benjamin J. Law et al. on Dec. 14, 1993. Haworth provides a mirror for mounting to the rear of the tow vehicle, thereby effectively putting the ball and hitch within line of sight of the operator. Law et al. provide masts attachable to the trailer hitch socket and to the ball. These masts extend sufficiently above their mountings as to be directly visible to the operator. The devices of Haworth and Law et al. depend upon restoring line of sight control to the operator rather than providing a visible indicator within the cabin, as seen in the present invention. These direct viewing arrangements are susceptible to distortions of perception, since depth perception may be distorted by either invention.

Apparatus for mechanically aligning the two vehicles during maneuvering of the tow vehicle is shown in U.S. Pat. Nos. 4,854,604, issued to Bradley E. Stallsworth on Aug. 8, 1989, and 4,991,865, issued to Thomas E. Francisco on Feb. 12, 1991. In both cases, the apparatus lacks indicators audible or visible to the operator, therefore relying upon the operator to steer the tow vehicle without constant feedback, as provided by the present invention.

None of the above inventions and patents, taken either singly or in combination, is seen to describe the instant invention as claimed.

SUMMARY OF THE INVENTION

The present invention provides a visual display to the operator of a tow vehicle maneuvering the tow vehicle into alignment with a trailer. The display comprises a matrix of indicating lamps which indicate axial alignment of the respective vehicles and also proximity between the two vehicles. This display is conveniently located in the cabin of the tow vehicle, so that the operator is not obliged periodically to exit the vehicle to visually observe progress.

The display is driven by a plurality of switches which are operated by a cord or the like which is paid out from a storage reel mounted on the tow vehicle. The cord passes over a rotatable pulley magnetically adhered to the hitch of the trailer and then extends to a take up reel mounted on the tow vehicle. Length of paid out cord operates switches indicating proximity between the vehicles. Angular orientation of components of the storage and take up reel operate switches indicating deviation from axial alignment between the tow vehicle and the trailer.

Accordingly, it is a principal object of the invention to provide apparatus for indicating to the operator of a tow vehicle relative positions of the tow vehicle and an associated trailer.

It is another object of the invention to provide a visual display within the cabin of the tow vehicle.

It is a further object of the invention to utilize mechanical connection to or engagement of both the tow vehicle and the trailer to provide inputs to the indicator.

Still another object of the invention is to enable secure yet readily removable temporary mounting of apparatus to at least one of the tow vehicle and the trailer.

An additional object of the invention is to indicate both relative axial alignment between the tow vehicle and the trailer, and also proximity between tow vehicle and trailer.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
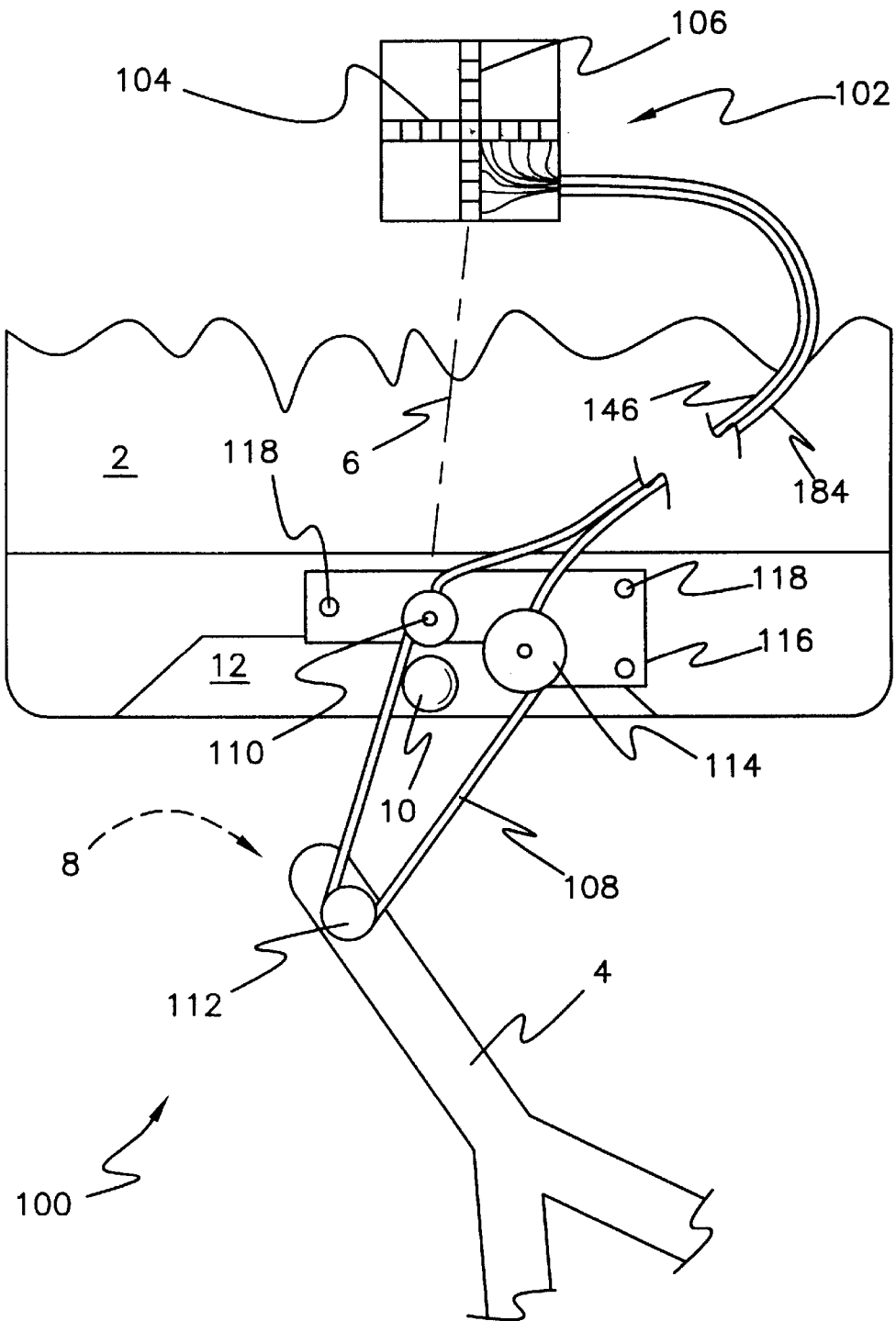
FIG. 1 is an environmental, diagrammatic view of the invention.

FIG. 1 of the drawings shows novel apparatus 100 mounted on a tow vehicle 2 and to the tongue 4 of a trailer (not shown in its entirety). Apparatus 100 indicates relative axial alignment and proximity existing between tow vehicle 2 and the trailer. As employed herein, axial alignment signifies alignment of the longitudinal axis 6 of tow vehicle 2 and the socket 8 formed in tongue 4 for receiving a ball 10. It is not necessary that the trailer be aligned along its longitudinal axis with respect to tow vehicle 2.

Apparatus 100 includes a plurality of visual indicators, preferably in the form of a matrix of illuminable lamps or indicating lights 102. Indicating lights 102 are located in the cabin (not shown) of tow vehicle 2, where they will be in ready view of the operator of tow vehicle 2. The matrix preferably includes a row 104 of indicating lights 102 and a column 106 of additional indicating lights 102 arranged perpendicularly to row 104. The matrix is positioned by the driver so that row 104 indicates angular deviation of socket 8 of tongue 4 from longitudinal axis 6 of tow vehicle 2, column 106 representing proximity between socket 8 and ball 10.

A probe of variable geometry for sensing relative axial alignment and proximity between tow vehicle 2 and the trailer by physical contact with both the tow vehicle and the trailer is provided by a flexible cord 108 stored on and paid out by a storage reel 110. Cord 108 engages a pulley 112 mounted on tongue 4, preferably at socket 8. Slack which would otherwise exist in cord 108 is taken up by take up reel 114 which is also mounted on tow vehicle 2. Storage and take up reels 110, 114 are mounted on a base plate 116 which is fastened to bumper 12 of tow vehicle 2 by bolts 118.

Figure 2:
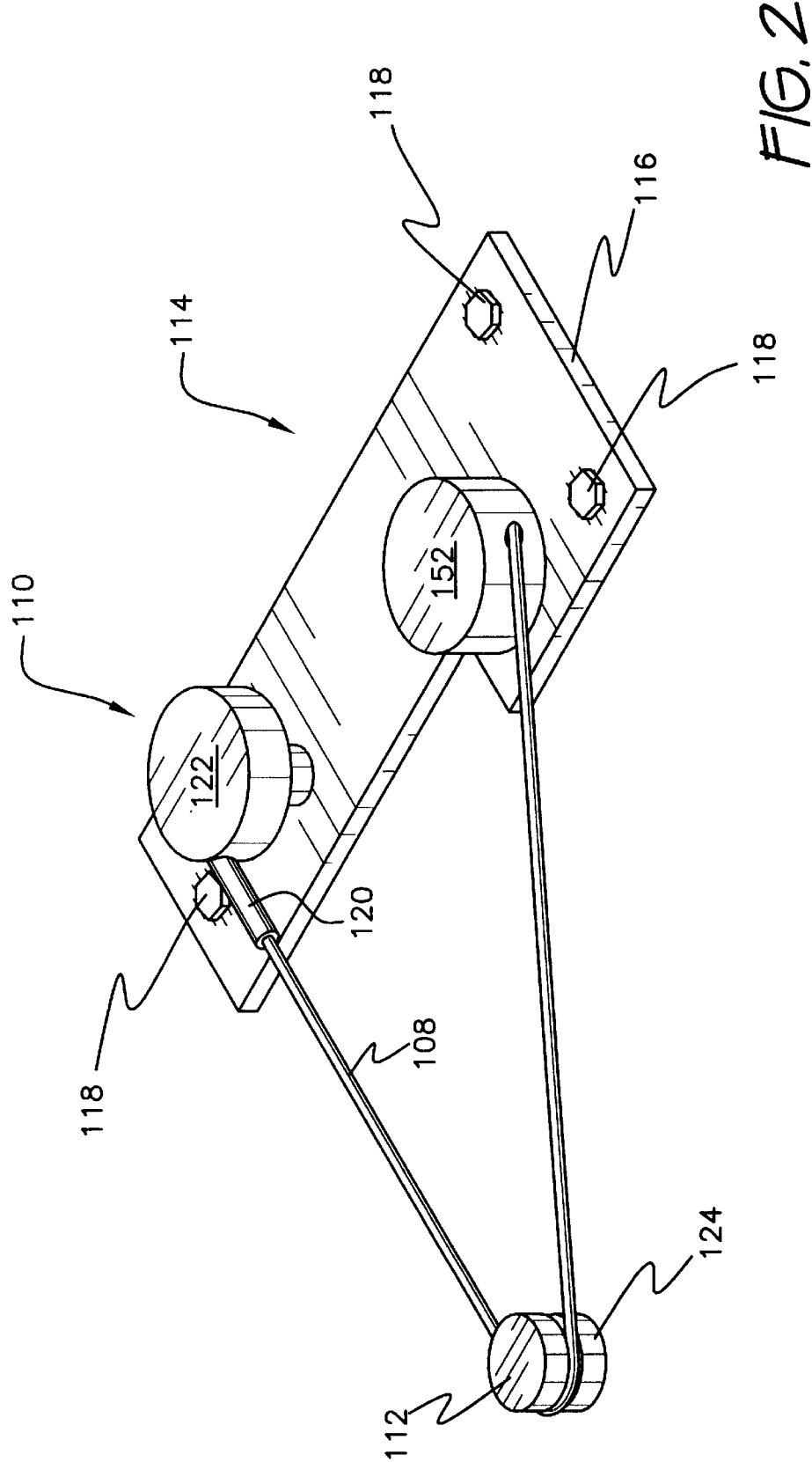
FIG. 2 is a perspective view of the sensing portion of the invention.

Operative positions of the probe are shown in FIG. 2. Storage reel 110 is seen to have a guide 120 which constrains the housing 122 of storage reel 110 to rotate in accordance with the direction of cord 108 as cord 108 stretches in a straight line to pulley 112. Switches (see FIG. 3) are dependent upon this rotation for proper indication of axial alignment, as will be explained hereinafter.

Pulley 112 has a mounting element 124 for mounting to tongue 4 of the trailer. Preferably, mounting element 124 is a magnet, which enables pulley 112 to be both securely temporarily installed on and readily removed from the trailer.

Storage reel 110 and take up reel 114 are each associated with switches 126 (see FIG. 3), 182 (see FIG. 5) for selectively rendering each visual indicator active. In the embodiment depicted, the matrix of illuminable lamps 102 are connected to power by these switches 126, 182. Storage reel 110 and take up reel 114 house switch actuating apparatus for respectively operating switch 126 to signal sensed alignment between the tow vehicle and the trailer and deviation from alignment, and switch 182 to signal sensed proximity between tow vehicle 2 and the trailer.

Figure 3:
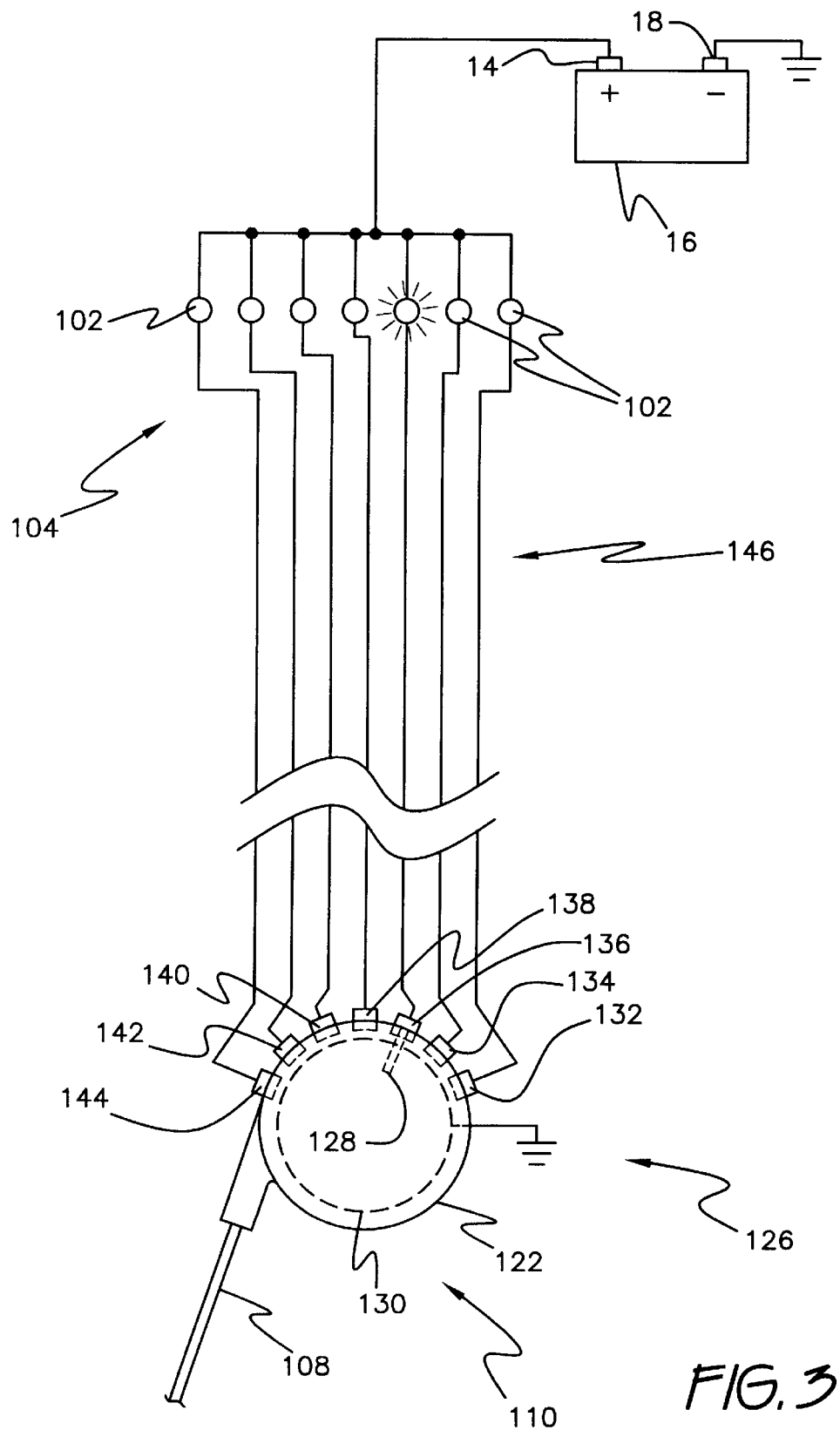
FIG. 3 is a diagrammatic detail view of a switch mechanism seen at the left of FIG. 2, and associated remote indicating lights.
Figure 4:
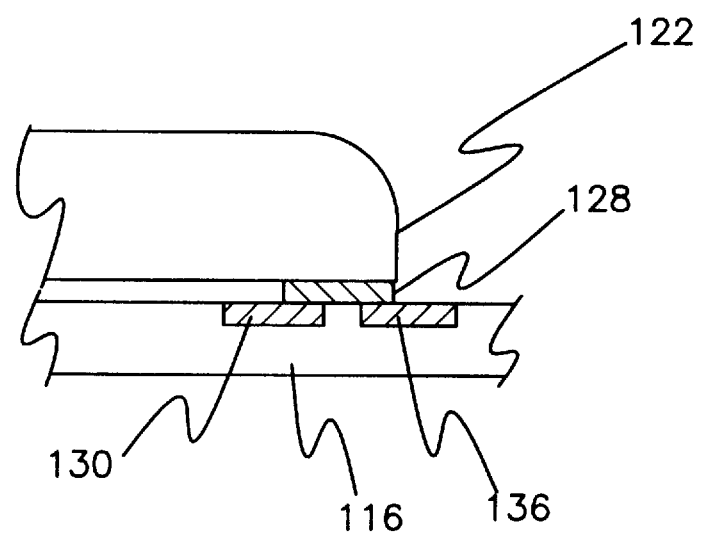
FIG. 4 is a side elevational, partly cross sectional detail view of the switch mechanism of FIG. 3.

FIG. 3 illustrates operation of switch 126, for operating indicating lights 102 of row 104 for signaling alignment and deviation therefrom. Housing 122 of storage reel 110 rotates responsive to the direction of cord 108 as it stretches between storage reel 110 and pulley 112, as seen in FIG. 2. Housing 122 has a bridging conductor 128 disposed upon the lower surface thereof. Bridging conductor spans a grounded electrically conductive ring 130 and an electrical contact 132, 134, 136, 138, 140, 142, or 144. Ring 130 and contacts 132 . . . 144 are disposed upon base plate 116, which is electrically non-conductive, as seen in FIG. 4. Referring again to FIG. 3, each contact 132, 134, 136, 138, 140, 142, or 144 is connected by circuitry 146 to a single associated indicating light 102 of row 104. Indicating lights 102 of row 104 are connected to positive terminal 14 of battery 16 of tow vehicle 2, in vehicles in which negative terminal 18 is grounded.

As housing 122 rotates responsive to cord 108 moving guide 120, bridging conductor 128 also rotates, progressively contacting a different contact 132, 134, 136, 138, 140, 142, or 144, and thereby illuminating a respective corresponding indicating lamp 102 of row 104. It will be understood that the spool (not shown) of reel 110 rotates independently of housing 122. Cord 108, pulley 112, housing 122 and guide 120 of storage reel 110, and take up reel 114 thus combine to provide switch actuating apparatus without which switch 126 would be inoperative.

Figure 5:
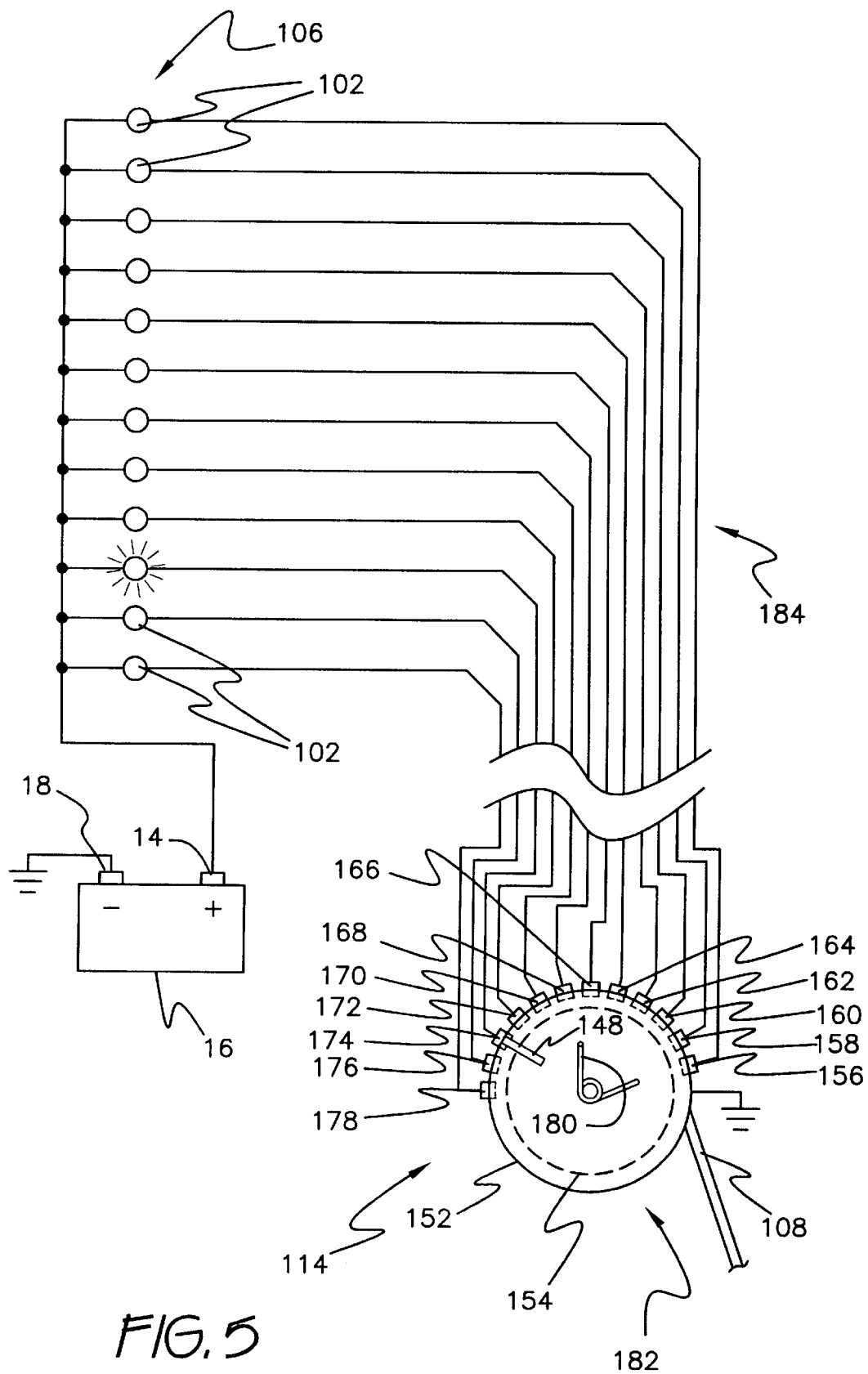
FIG. 5 is a diagrammatic detail view of a second switch mechanism seen at the right of FIG. 2.

Turning now to FIG. 5, it will be seen that take up reel 114 has a switching arrangement generally similar to that of storage reel 110, with an important exception. That is, bridging conductor 148 is fixed to spool 150 of take up reel 114, rather than to housing 152. The switch 182 formed by grounded ring 154, bridging conductor 148, and contacts 156 . . . 178 is thus responsive to the length of cord 108 taken up on spool 150, and thus indicates relative proximity between tow vehicle 2 and the trailer. Switch 182 thus illuminates appropriate indicating lights 102 of vertical column 106, and is connected to indicating lights 102 by circuitry 184. Switch actuating apparatus corresponding to that of switch 126 is thus also provided for switch 182.

FIG. 5 illustrates a tensioning element acting on take up reel 114. A coil spring 180 is arranged to bias spool 150 to rotate in a direction winding in cord 108. Spring 180 is coiled around an axle (not shown) on which spool 150 is rotatably mounted. One end of spring 180 engages spool 150, and the other end engages base plate 116 or another component fixed relative to spool 150. This arrangement is well known and need not be set forth in greater detail. It is preferred that storage reel 110 be provided with a brake or other frictional resistance to rotation so that cord 108 is maintained under just sufficient tension to constrain cord 108 to be stretched tight, while still being wound on spool 150 responsive to tension imposed by spring 180.

The present invention is subject to modifications and variations which may be introduced thereto without departing from the inventive concept. Obviously, the order in which direction of maneuvering tow vehicle 2 illuminates indicating lights 102 may be modified to suit individual preference. Also, the indicator could be other than indicating lights 102. For example, the indicator could comprise flags or pointers (not shown) indicating the active condition by their position, or arrows disposed movably upon a two dimensional display (not shown).

The probe could be a telescoping rod (not shown), rather than comprising flexible cord 108.

It is possible that switches 126, 182 and their respective contacts could be located in either storage reel 110 or take up reel 114, with appropriate modifications to the structure of each.

In a further example, the tensioning element of take up reel 114 may be other than spring 180.

It is also considered within the scope of this invention to use a single, vehicle mounted reel with angular and cord extension measurement capabilities. The trailer socket area would then only need to mount a single detachable cord and its proximity to the hitch ball would be electrically determined in polar coordinates by the reel on the tow vehicle. The reel also could be easily detachable from the tow vehicle with plugs for the wiring so as to form a completely portable unit.

It is to be understood that the present invention is not limited to the embodiments described above, but encompasses any and all embodiments within the scope of the following claims.

I claim:

1. Apparatus for indicating relative axial alignment and proximity between a tow vehicle and a trailer comprising:

a plurality of visual indicators;

a plurality of switches each having a plurality of contacts for rendering each visual indicator active;

a probe for sensing relative axial alignment and proximity between the tow vehicle and the trailer, where said probe further comprises a flexible cord;

a storage reel for mounting on the tow vehicle for storing and paying out said flexible cord;

a pulley having a mounting element for mounting said pulley to the trailer, where said mounting element is a magnet;

a take up reel mounted on the tow vehicle for taking up said flexible cord, said take up reel having a tensioning element for biasing said take up reel such that said flexible cord is wound in to said take up reel;

where said switches located proximate said storage reel are attached to indicators to indicate the relative angle between the tow vehicle and the trailer and where said switches located proximate said take up reel are attached to indicators to indicate the distance between the tow vehicle and the trailer.

\* \* \* \* \*